Aug. 30, 1932.   J. J. SHOEMAKER   1,874,369
PROTECTIVE MEANS FOR BURIED CABLES
Filed Nov. 27, 1929   2 Sheets-Sheet 1

INVENTOR.
Joseph J. Shoemaker
BY Sevan and Frye
ATTORNEYS.

Aug. 30, 1932.   J. J. SHOEMAKER   1,874,369
PROTECTIVE MEANS FOR BURIED CABLES
Filed Nov. 27, 1929   2 Sheets-Sheet 2

INVENTOR.
Joseph J. Shoemaker
BY
ATTORNEYS.

Patented Aug. 30, 1932

1,874,369

UNITED STATES PATENT OFFICE

JOSEPH J. SHOEMAKER, OF CLAWSON, MICHIGAN

PROTECTIVE MEANS FOR BURIED CABLES

Application filed November 27, 1929. Serial No. 410,078.

This invention relates to means for protecting insulated cable elements or pipes which are buried in the ground at desired depths, and which so far as the surrounding ground conditions, including moisture, are concerned, need no further protection, but which are liable to be injured by excavating tools, particularly in the hands of careless workmen when digging is in progress adjacent thereto, either for the purpose of burying other cable elements or for the purpose of access to the already buried cable for purposes of repair, connection of branching lines or the like. It has for its object an improved organization of parts whereby such a cable may be protected, either throughout its length or at selected points where further excavation and the resultant careless use of the tools therefor is likely to occur. My idea is adapted both for protection of straightaway cable installations or as a coverage for angled or bent portions thereof, and as will be brought out in the descriptive specification various modifications such as the details of the clips by which the protective members are structurally correlated may be indulged in, without departure from the fair spirit of my invention.

Figure 4:
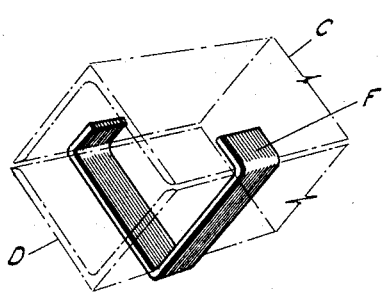
Figure 4 is a partly phantomed perspective similar to one section of Figures 1 and 2, designed to bring out the seizing engagement of the marginal edges of the protective pieces by the holding clips.

A indicates a cable, which may be suitably armored or protected against dampness when installed in the ground, as for example, by the lead or other protective sheathing B, and C and D represent marginally correlated angle iron pieces, which being positioned about the cable in the manner shown, generally after the cable has already been laid in its trench, form a generally rectangular enclosure thereabout, within which the cable spacedly lies, the exact degree of filling of the space thus enclosed being a matter of choice and selection. The lower one of these angle iron sections, as D, may be either rested directly on the ground at the bottom of the trench which has been dug for the reception of the cable, or, if desired, it may be placed in the correspondingly recessed top portion of the cradle E, which may be a wooden block or equivalent member. With the angle iron sections C and D thus positioned, there is placed about them at suitable points, either intermediately of their length or at the line of union of meeting sections thereof, a sufficient number of holding clips, as F, the contour of which is brought out with particular clearness in partly phantomed Figure 4. There is of course no objection to having these clips of such length that they entirely surround the rectangular structure formed by the correlation of the angle irons C and D, and indeed mere wires might be used for this purpose, but it is sufficient for effecting their structural correlation if the overbent end portions of these clips F overengage each of the meeting edges of the angle irons C and D, as brought out with particular clearness in Figure 4.

With the parts as thus assembled, a protective structure quite independent of the cable and its sheathing is firmly positioned thereabout, so that it will take the impact or cutting effect of a pick or spade carelessly driven into the ground in the location where the cable is buried, and which would otherwise be likely to injure the protective sheathing of the cable itself.

Figure 5:
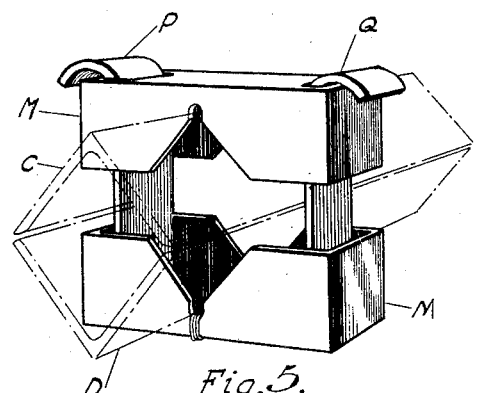
Figure 5 is a partly phantomed perspective, showing a modified form of clip or holding member in position about the protective angle irons.

In case for any reason the clips F heretofore described for the correlation of the angle irons C and D are deemed unsatisfactory or inadequate, I have shown in Figure 5 a modified form of structure for holding the angle irons together. This comprises a pair of complementarily apertured box or shell members M and N, in the latter of which the lower angle iron D may be rested, while the correspondingly cut away portion of the top shell member M overengages the top angle iron piece C. From the lower one of these box elements, as N, there project upwardly a pair of strap members as P and Q, which, after the angle iron elements and the box elements are assembled as described, may be bent over at their top ends, so as to clamp the parts thus assembled in desired relation.

Figure 1:
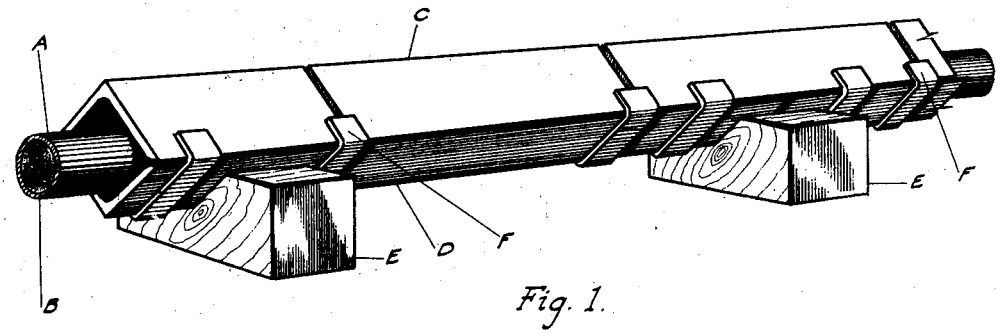
Figure 1 is a perspective of a cable section with the preferred form of my improved protective shell positioned thereabout.
Figure 2:
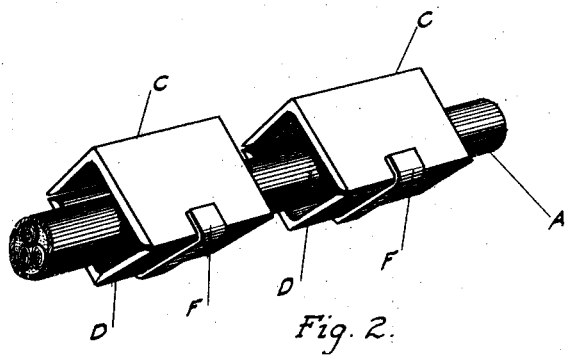
Figure 2 is a similar perspective designed to emphasize the possible protection of the cable only at certain points, and with surrounding protective members of different standard lengths from what is shown in Figure 1.
Figure 3:
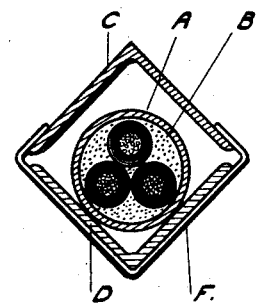
Figure 3 is a cross-sectional elevational view of the construction shown in Figures 1 and 2, bringing out particularly the position of the cable interiorly of the protective shell pieces.
Figure 6:
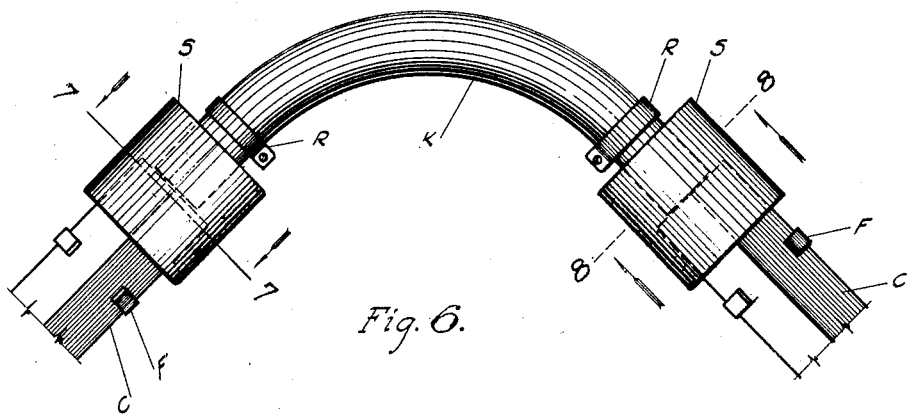
Figure 6 is a plan view showing the adaptability of my improved construction to a curved cable installation, the ends thereof being preferably protected by sleeves.
Figure 7:
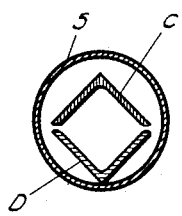
Figure 7 is a cross-sectional elevational view taken along the line 7—7 of Figure 6 and looking in the direction of the arrows there shown.
Figure 8:
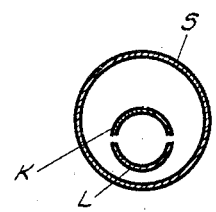
Figure 8 is a similar cross-sectional view showing a possible modified form of protective member relatively to the surrounding sleeve, being taken along the line 8—8 of Figure 6 and looking in the direction of the arrows there shown.

The possibility of the application of this construction to those portions or sections of a pipe which though straight, have positioned intermediate them a curved section, is illustrated in Figure 6, wherein the angle irons are held in position over the straight sections shown at either end of the figure as though there were no intermediate curved section which is designed to be protectively surrounded similarly to the function performed by the angle iron sections by the curved half-pipe sections as K and L. In order, however, to thoroughly protect the cable at the point where the protective angle irons end, I often find it desirable to position a sleeve, as S. These split pipe sections K and L are held in desired relation about the curved pipe or cable portion by means of the bands or straps R which are intentionally shown in somewhat spaced relation to the adjacent ends of these sleeves.

It is also obvious that not only may protective angle iron sections of selective and variant length be employed for this purpose, but that any pair of thus marginally meeting angle irons or equivalents thereof may be removed from about the cable for purposes of repair or similar access merely by detaching the holding clips appurtenant them and without disturbing other sections further along the cable or pipe.

What I claim is:

1. In combination with a pair of angle irons positioned with their lateral edges in substantial contact with one another to form an enclosure of generally rectangular cross sectional contour through which a cable may pass, separately attachable clip members positioned at intervals thereabout and engaging the major portion of the peripheral extent of the structure formed by said angle irons at their respective points of location thereon, whereby the latter are held against undesired disassemblage.

2. The combination, with a cable whose special protection at certain locations along its length is desired, of a pair of angle iron sections adapted to be individually positioned thereabout on diametrically opposite sides with their lateral edges in general contact with one another, and holding clips positionable about the major portion of the peripheral surfaces of the two angle irons as thus arranged at their respective points of location thereon to hold them in desired assembled relation about the cable.

3. In combination with a pair of angle irons individually positionable about a continuous cable whose added protection at certain locations in its length is desired, the lateral edges of said angle irons being designed to generally engage one another when positioned about the cable and thus forming a generally diamond-shaped surrounding shell therefor, and holding clip units positionable about said angle irons as thus assembled to hold the latter against undesired displacement from their described assembled position.

4. A protective shell applicable about an already positioned cable length, comprising a pair of angle iron members adapted to be placed about diametrically opposite sides of such cable, forming a cross-sectionally diamond shaped enclosure, and securing clips positioned at intervals about the major peripheral portion of said two piece angle iron structure as assembled, for holding the same in protectively assembled relation about the cable.

In testimony whereof I sign this specification.

JOSEPH J. SHOEMAKER.